US006380990B1

(12) United States Patent
Bessel

(10) Patent No.: US 6,380,990 B1
(45) Date of Patent: *Apr. 30, 2002

(54) METHOD AND APPARATUS FOR COMMAND AND CONTROL OF TELEVISION RECEIVER FOR VIDEO CONFERENCING APPLICATIONS

(75) Inventor: David H. Bessel, Poway, CA (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,363

(22) Filed: Oct. 6, 1997

(51) Int. Cl.$^7$ .................................................. H04N 7/14
(52) U.S. Cl. ...................... 348/806; 348/353; 348/552; 348/14.01; 348/14.05; 348/14.08; 348/14.09; 348/14.12
(58) Field of Search .......................... 345/2, 327, 333, 345/334, 335; 348/12, 14, 13, 15, 17, 739, 10, 553, 552, 806, 14.01, 14.02, 14.05, 14.07–14.09, 14.12; H04N 3/22, 7/14

(56) References Cited

U.S. PATENT DOCUMENTS

| 4,337,480 A | * | 6/1982 | Bourassin et al. ........... 348/552 |
| 4,338,632 A | * | 7/1982 | Falater ........................ 348/734 |
| 4,398,193 A | * | 8/1983 | Kuniyoshi et al. ...... 340/825.76 |
| 4,607,288 A | * | 8/1986 | Freyberger .................. 348/806 |
| 4,688,170 A | * | 8/1987 | Waite et al. ........... 395/500.48 |
| 4,731,654 A | * | 3/1988 | Itabashi et al. ............. 348/725 |
| 4,754,204 A |   | 6/1988 | Ando et al. .................. 315/367 |
| 4,858,006 A | * | 8/1989 | Suzuki et al. ................ 348/189 |
| 5,052,037 A | * | 9/1991 | Perleman ..................... 348/17 |
| 5,072,299 A | * | 12/1991 | Park ............................ 348/625 |
| 5,124,804 A | * | 6/1992 | Socarras ..................... 348/524 |
| 5,227,881 A | * | 7/1993 | Wess et al. .................. 348/512 |
| 5,283,561 A | * | 2/1994 | Lumelsky et al. .......... 345/340 |
| 5,483,128 A | * | 1/1996 | Chen ........................... 315/382 |
| 5,572,259 A | * | 11/1996 | Nohara ........................ 348/441 |
| 5,594,859 A | * | 1/1997 | Palmer et al. ............... 345/330 |
| 5,689,158 A | * | 11/1997 | Chen ........................ 315/382.1 |
| 5,745,909 A | * | 4/1998 | Perlman et al. ............. 707/513 |
| 5,760,838 A | * | 6/1998 | Adams et al. .............. 348/460 |
| 5,764,278 A | * | 6/1998 | Nagao .......................... 348/15 |
| 5,825,336 A | * | 10/1998 | Fujita et al. .................... 345/2 |
| 5,892,537 A | * | 4/1999 | Georges et al. ............... 348/14 |
| 5,896,130 A | * | 4/1999 | Tsuchiya et al. ............ 345/327 |
| 6,084,638 A |   | 4/2000 | Hare et al. .................. 348/552 |
| 6,161,156 A |   | 12/2000 | Suzuki et al. ............... 710/101 |

* cited by examiner

Primary Examiner—Michael Lee
Assistant Examiner—Linus H. Lo
(74) Attorney, Agent, or Firm—Blakely, Sokoloff, Taylor & Zafman LLP

(57) ABSTRACT

An alignment command is transmitted from a video conference application to a television receiver using an existing command path within the television receiver. The television receiver is then configured in accordance with the alignment command. Transmitting the alignment command may include formatting the command according to a protocol compatible with the existing command path within the television receiver. For example, a signal protocol compatible with a television remote control may be used. Further, the alignment command may be received at an input jack associated with the existing command path within said television receiver. Configuring the television receiver may be accomplished by decoding the alignment command to obtain an alignment parameter for the television receiver. This may include accessing a table (e.g., a look-up table stored in a memory) to obtain the alignment parameter. The alignment parameter may then be used to produce a display alignment command for the television receiver. The television may include means for receiving the alignment command from the video conference application and means for configuring the television according to the alignment command. The receiving means may include a command input path adapted to receive the alignment command. The television's means for configuring generally includes a programmable controller configured to provide a display alignment command to configure the television according to the alignment command.

20 Claims, 2 Drawing Sheets

METHOD AND APPARATUS FOR COMMAND AND CONTROL OF TELEVISION RECEIVER FOR VIDEO CONFERENCING APPLICATIONS

RELATED APPLICATION

The present application is related to co-pending application No. Ser. No. 08/946,015, filed Oct. 6 1997, entitled "Automatic Television Picture Quality Optimizer and Mode Control for Video Conferencing Applications" by David H. Bessel and assigned to the Assignee of the present invention.

FIELD OF THE INVENTION

The present invention is related to the field of television receivers and, more particularly, to the automatic alignment of such receivers in special applications such as video conferencing.

BACKGROUND

Conventional television receivers are designed and configured to optimize the display quality of video program material. For example, in the United States, televisions are typically optimized to display NTSC and/or S-video signals from sources such as television antennas, video cassette recorders, digital satellite television receivers and/or cable television sources. Under some circumstances, however, it is desirable to display other types of video images on a television receiver. For example, modern video conferencing systems often combine video signals (which may be formatted according to any of a variety of video signal transmission standards) with computer graphic signals (such as are used to display a variety of control buttons, etc.). Because the television is configured to optimize the display of conventional video signals, however, the resultant display of video conference image signals may be less than satisfactory.

To overcome some of these problems, computer-generated or other image signals are sometimes converted into conventional NTSC signals before being displayed. Although this arrangement may alleviate some of the problems associated with the display of such images on televisions, it does have some undesirable side effects. For example, because televisions are generally setup to overscan the picture, i.e., televisions typically do not display the entire image broadcast by the video source, and computer-generated images often use the entire visible raster (e.g., on a computer video monitor), the outer edges of the computer-generated image may be cut off when displayed on a television receiver. This may be compensated for through manual control inputs which may be used to adjust the picture size to accommodate the entire computer-generated image. The control inputs are generally provided by a user through manual input command paths within the television receiver, for example, hand-held remote control command input paths. Such alterations of the picture size will, however, have the drawback of effectively shrinking the display area of television receiver. Further, additional command and control inputs will be required when the television receiver is used to display conventional television video input signals (e.g., from a cable television source) to recover the original display size. Additionally, because the picture quality of a conventional television receiver degrades rapidly at the edges of the display, computer-generated material at the edges of the of the display (which may often be text, e.g., for a menu) will be displayed poorly.

SUMMARY OF THE INVENTION

In one embodiment, the present invention provides a method of aligning a television receiver. An alignment command is transmitted from a video conference application to the television receiver using an existing command path within the television receiver. The television receiver then reconfigures itself in accordance with the alignment command. Transmitting the alignment command may include formatting the command according to a protocol compatible with the existing command path within the television receiver. For example, a signal protocol compatible with a television remote control may be used. Further, the alignment command may be received at an input jack associated with the existing command path within said television receiver.

Configuring the television receiver may be accomplished by decoding the alignment command to obtain an alignment parameter for the television receiver. This may include accessing a table (e.g., a look-up table stored in a memory) to obtain the alignment parameter. The alignment parameter may then be used to produce a display alignment command for the television receiver.

In another embodiment, a television includes means for receiving an alignment command from a video conference source and means for configuring the television according to the alignment command. The receiving means may include a command input path adapted to receive the alignment command. This command input path may include a buffer for the alignment command.

The television's means for configuring generally includes a programmable controller configured to provide a display alignment command to configure the television according to the alignment command. In addition, decoding means may be provided to decode the alignment command to obtain an alignment parameter. Such decoding means may include a look-up table (e.g., as stored in a memory) which includes the alignment parameter.

The television may also include a command path configured to provide command inputs to the video conference source and to the programmable controller. This command path may comprise a remote control input sensor adapted to receive command inputs from an associated remote control unit.

In yet a further embodiment, a command input path is provided. The command input path includes means for receiving a command signal from a video conference source indicating a television alignment parameter and means for configuring a television according to the alignment parameter. The means for receiving may comprise a control port configured to buffer the command signal. The means for configuring may comprise a programmable controller configured to obtain the alignment parameter from the alignment command. This may be accomplished using a look-up table (e.g., as stored in a memory) which includes the alignment parameter and which is coupled to the programmable controller.

BRIEF DESCRIPTION OF THE DRAWINGS

The present invention is illustrated by way of example and not limitation in the figures of the accompanying drawings in which.

DETAILED DESCRIPTION

Figure 1:
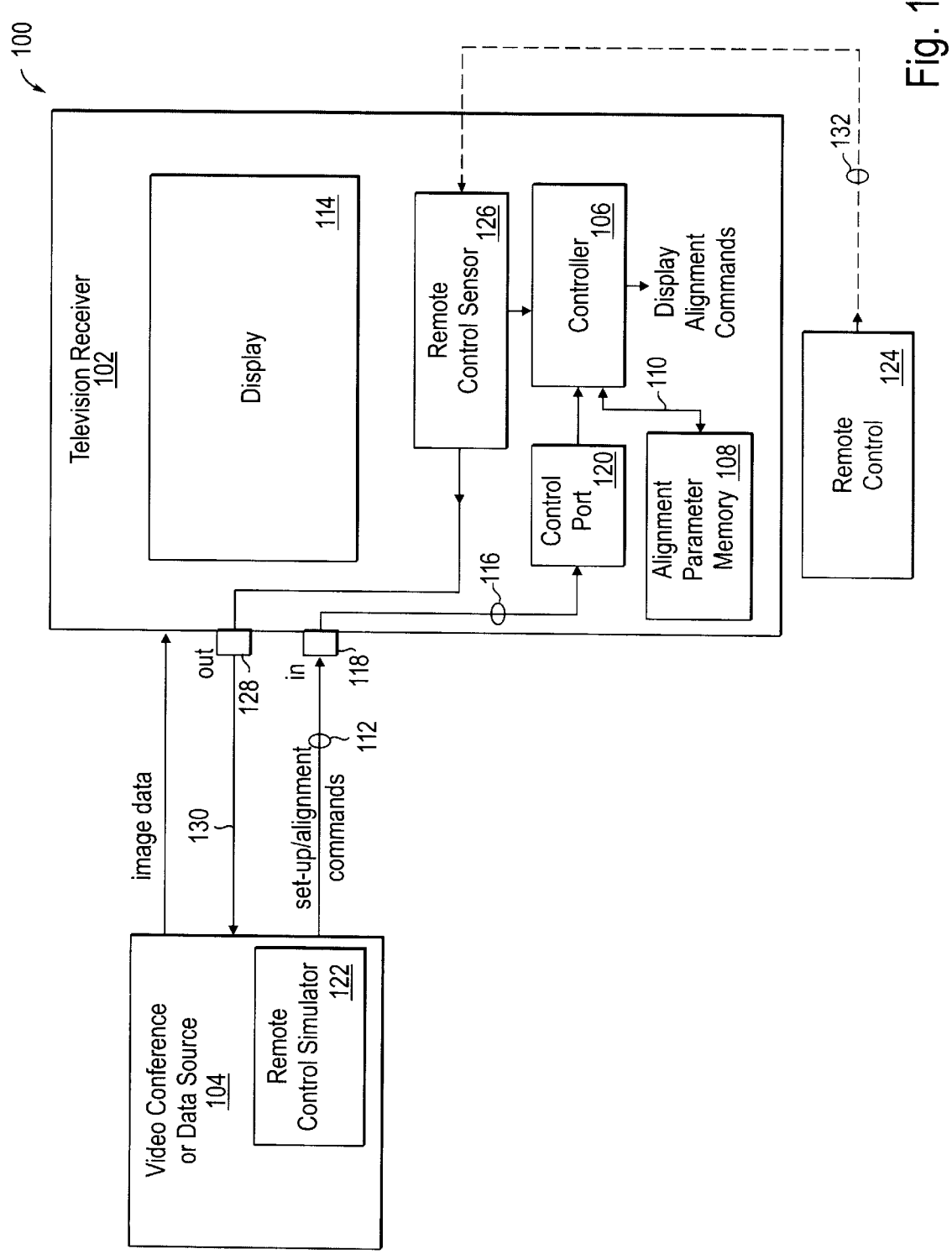
FIG. 1 illustrates a television system configured according to one embodiment of the present invention.

A method and an apparatus for automatically aligning a television receiver are disclosed. In one embodiment, an alignment command is transmitted from a video conference application to the television receiver using an existing command path within the television receiver. The television receiver is then configured in accordance with the alignment command. As used herein, the terms "configured", "configure" and the like are used to describe the arrangement (e.g., through automatic processes) of a television receiver's internal circuitry (e.g., display circuitry). In digital systems, such as digital televisions and the like, such configuration is generally accomplished through the programming of registers or similar programmable elements or devices, which programming is used to reflect a preferred/desired state or states of one or more parameters. Transmitting the alignment command may include formatting the command according to a protocol compatible with the existing command path within the television receiver. For example, a signal protocol compatible with a television remote control may be used. Further, the alignment command may be received at an input jack associated with the existing command path within said television receiver.

Configuring the television receiver may be accomplished by decoding the alignment command to obtain an alignment parameter for the television receiver. This may include accessing a table (e.g., a look-up table stored in a memory) to obtain the alignment parameter. The alignment parameter may then be used to produce a display alignment command for the television receiver.

In another embodiment, a television includes means for receiving an alignment command from a video conference source and means for configuring the television according to the alignment command. The receiving means may include a command input path adapted to receive the alignment command. This command input path may include a buffer for the alignment command.

The television's means for configuring generally includes a programmable controller configured to provide a display alignment command to configure the television according to the alignment command. In addition, decoding means may be provided to decode the alignment command to obtain an alignment parameter. Such decoding means may include a look-up table (e.g., as stored in a memory) which includes the alignment parameter.

The television may also include a command path configured to provide command inputs to the video conference source and to the programmable controller. This command path may comprise a remote control input sensor adapted to receive command inputs from an associated remote control unit.

In yet a further embodiment, a command input path is provided. The command input path includes means for receiving a command signal from a video conference source indicating a television alignment parameter and means for configuring a television according to the alignment parameter. The means for receiving may comprise a control port configured to buffer the command signal. The means for configuring may comprise a programmable controller configured to obtain the alignment parameter from the alignment command. This may be accomplished using a look-up table (e.g., as stored in a memory) which includes the alignment parameter and which is coupled to the programmable controller.

FIG. 1 illustrates a television system 100 configured according to one embodiment of the present invention. Television system 100 includes a television receiver 102 which is adapted to display both conventional video signals (e.g., NTSC, S-video, PAL, etc.) and computer-generated image signals such as may be presented by a video conference/data source 104. Further, television receiver 102 is capable of automatically configuring its display characteristics according to a set of alignment and/or set-up parameters to optimize the display of received signals. To accomplish these tasks, television receiver 102 include a microprocessor or other programmable controller 106 and a set-up/alignment parameter memory 108. Controller 106 is coupled to memory 108 through a bus 110 and is configured to read memory 108 to obtain set-up/alignment parameters. These set-up/alignment parameters may then be used to produce display alignment commands for other units (e.g., display units) within television receiver 102 so that the display characteristics of television receiver 102 are configured according to the setup/alignment parameters.

Memory 108 may comprise a read/write memory (or memories) so that the setup/alignment parameters stored therein can be updated or overwritten as required. In other embodiments, memory 108 may be a read only memory (or memories), in which case the set-up/alignment parameters are stored as a look-up table and controller 106 may retrieve appropriate values from the look-up table according to various set-up/alignment commands. In still further embodiments, memory 108 may comprise a look-up table that is overwriteable. In such embodiments, preferred set-up/alignment parameters may be stored in memory 108 for typical video and/or computer-generated image signal applications and such values may be updated according to new video or other signal standards as required. This provides a degree of flexibility and backwards compatibility for television receiver 102 as changes to video signal standards are made. Still other configurations for memory 108 are possible and each may provide the basic functionality of storing set-up/alignment parameters for use by controller 106.

The use of controller 106 allows television receiver 102 to adapt its display characteristics according to the type of image signals (e.g., NTSC video, computer-generated images, etc.) to be displayed thereon. These display characteristics (e.g., image horizontal and vertical size, etc.) may be changed according to numeric parameters (e.g., the set-up/alignment parameters from memory 108) to optimize the display of such images. Further, by allowing controller 106 to accept different set-up/alignment commands through existing command and control paths (e.g., as may be originally provided for receiving commands from a video cassette recorder or other remote control unit), television receiver 102 may be configured to optimize the display of video conference images/data automatically, without need for user intervention. Thus, television receiver 102 may have a "television" mode, wherein the set-up/alignment parameters used by controller 106 are adapted to provide optimum viewing of conventional television video signals, and a "video conference" mode, wherein the set-up/alignment parameters are adapted to provide optimum viewing of such images and data.

Television receiver 102 may switch between its television and video-conference modes (i.e., controller 106 may load appropriate set-up/alignment parameters from memory 108) in response to set-up/alignment commands 112 from video conference source 104. Video conference source 104 may be part of television receiver 102 or it may be a separate, stand-alone unit. In either of these configurations, video conference source 104 is configured to provide set-up/alignment commands 112 to controller 106 to allow controller 106 to load set-up/alignment parameters from memory 106 to optimize viewing of video conference image data.

When conventional television video signals (e.g., NTSC or S-video signals) are provided to television receiver 102 for display on display 114, controller 106 accesses the prestored set-up/alignment parameters for such conventional video signals from memory 108 and configures the display units of television receiver 102 accordingly. When video conference image data is to be displayed on television receiver 102, video conference source 104 passes set-up/alignment control messages 112 to controller 106 through an existing command path 116 (e.g., a hand held or other remote control command path or an I²C production alignment command path as is used to align television receiver 102 during manufacture) within television receiver 102. Alternatively, a specially adapted command path may be used. The control messages may include specific set-up/alignment commands for controller 106 or may be instructions to load preferred alignment parameters from memory 108 for the display of the video conference image data. In either case, the alignment commands 112 may be passed through command path 116 from an input jack 118 to a control port 120 coupled to controller 106. Control port 120 may include a buffer to store commands 112 and interrupt or other appropriate logic to communicate with controller 106.

Commands 112 may be specific set-up/alignment parameters for television receiver 102. For example, consider that to convert from an overscanned television image format to one compatible with the display of video conference images, it may be necessary to reduce the raster length of television receiver 102 so that an entire active line of the video conference image will be visible on the television display 114. Accordingly, by knowing the raster length of the television receiver 102 and measuring the active video time, horizontal front porch and horizontal frequency values for the video conference image data, video conference source 104 may transmit appropriate alignment parameter values for the television receiver's horizontal picture size and position. In some cases, this may be done by direct computation or it may be accomplished through use of a look-up table. Having thus determined the horizontal and vertical parameters for television receiver 102, in a like fashion, optimal values for other geometry parameters such as upper and lower pin cushion, vertical bow, pin amplitude, vertical and horizontal angle, etc. can be determined. Similarly, the RGB (or other video format) parameters of the video conference image data can be used to determined appropriate brightness and contrast settings, etc. for television receiver 102.

The calculated set-up/alignment parameters for television receiver 102 may be transmitted directly to controller 106 or may be loaded into specified locations in memory 108 (in which case video conference source 104 would notify controller 106 that the values should be read), e.g., under the control of controller 106 or a direct memory access (DMA) controller (not shown). In either case, the parameters may be used to adjust the alignment of television receiver 102 to optimize the display of the video conference image data. In still further embodiments, video conference source 104 may transmit commands 112 which indicate to controller 106 that the video conference image signals comply with a known video conference image format standard. Controller 106 may use these commands to determine which of a set of prestored set-up/alignment parameters should be loaded from memory 108. Further still, video conference source 104 may continually or periodically monitor the video conference image data and update the set-up/alignment commands 112 if any changes in these signals are observed. When regular television video signals are again provided to television receiver 102, controller 106 will revert to using set-up/alignment parameters appropriate for such input signals.

To provide the set-up/alignment commands 112, video conference source 104 may include a remote control simulator 122. Remote control simulator 122 simulates the signal protocol used by television remote control 124, thus the set-up/alignment commands 112 resemble conventional commands 132 provided to television receiver 102 by remote control 124. By using such a signal protocol, the present invention allows for the use of an existing command path 116 (as may be provided to transport command signals from a video cassette recorder or other remote control unit) within television receiver 102 to transport the set-up/alignment commands for the video conference application. Controller 106 basically interprets the set-up/alignment commands 112 as being equivalent to commands received from remote control 124 (e.g., through remote control sensor 126) and configures television receiver 102 accordingly.

In addition, television receiver 102 includes an output jack 128 which can be used to transmit control messages to video conference source 104. For example, using remote control 124, a user can enter commands for video conference source 104. These commands are received by television receiver 102 through remote control sensor 126. The commands are passed to controller 106 but are recognized as being directed for another unit (in this case video conference source 104), e.g., by examining an address or other portion of the command. Thus, controller 106 ignores such commands. The commands are further provided to output jack 128 and transmitted to video conference source 104 through line 130. In this way, the remote control input path including remote control sensor 126 is used as a command and control path for video conference source 104, obviating the need for a separate command and control path/unit. Because video conference source 104 is already configured to provide commands 112 according to the same signal protocol as those provided by remote control 124, video conference source 104 is capable of decoding the commands from remote control 124 received on line 130. Of course, commands 132 from remote control unit 124 to controller 106 will also be transmitted to video conference source 104 across line 130, however, such commands are recognized as being directed to controller 106 and are ignored by video conference source 104.

Thus, existing command and control paths within television receiver 102 may be used for video conference applications. For example, remote control 124 may be used to initiate video conference calls. Commands to configure television receiver 102 for its video conference mode may be transmitted to controller 106 through remote control sensor 126 and the same command input path may be used to activate video conference source 104 to initiate the call. Alternatively, the remote control 124 may be used to answer an incoming video conference call, with appropriate set-up/alignment commands 112 for television receiver 102 being provided from video conference source 104 through command path 116.

To optimize the display of video conference images, set-up/alignment commands 112 for television receiver 102 should accurately determine the vertical and horizontal geometries for the display circuitry of television receiver 102 as well as the color information to be displayed. These parameters may be computed from video timing and other information contained within the video conference image signals. For example, parameters such as horizontal and vertical picture size and position; pin amplitude; upper and lower pin; pin phase; vertical bow and angle; reference pulse position; sub color, hue and brightness; gamma level; sharpness frequency and limited; brightness, contrast, hue and color; and sharpness may all need to be provided as set-up/alignment command signals 112 to television receiver 102 to optimize the display of video conference image data. As discussed above, these parameters may be provided directly to controller 106 or may be accessed from memory 108 in response to command signals 112 indicating that controller 106 should use a prestored set of set-up/alignment parameters in memory 108 which will optimize the display of the video conference image data.

Figure 2:
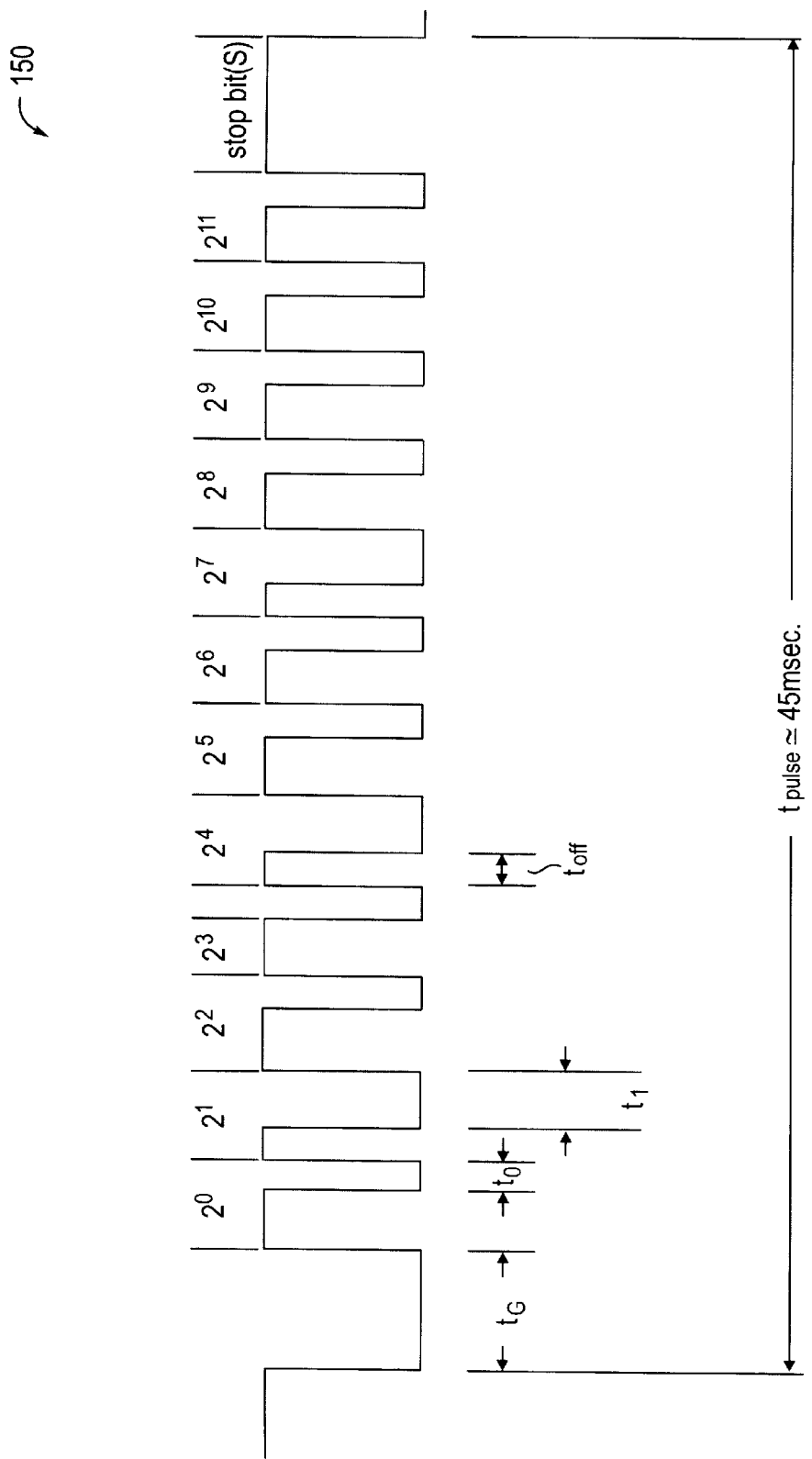
FIG. 2 illustrates an exemplary command signal input for aligning a television receiver according to one embodiment of the present invention.

In general, the command and control signals 132 from remote control 124 (and, hence, command signals 112 from video conference source 104) are part of a serially formatted data stream and individual commands may be transmitted through the use of an arbitrary modulation scheme. In one embodiment, 12-bit pulse width modulation encoding is used. (Of course, other signal formats may be used.) FIG. 2 illustrates an exemplary command input signal 150 which may be decoded by controller 106 to provide a desired response. In the illustration, $t_G$ is a guide pulse of nominal duration 2.4 msec (±0.4 msec.); $t_0$ is a data "0" of nominal duration 1.2 msec. (±0.28 msec.), $t_1$ is a data "1" of nominal duration 1.8 msec. (±0.28 msec.) and $t_{off}$ has a duration of 0.32–0.75 msec. The total duration of the command input signal 150 is approximately 45 msec. By varying the asserted bits within the command input signal 150, numerous commands may be provided for.

The specific commands 112 to be provided from video conference source 104 to television receiver 102 will depend upon the operating mode of the television receiver at the time video conference activity is initiated. Thus, video conference source 104 may monitor these operating modes, e.g., by snooping the commands 132 provided from remote control 124 to controller 106. In one possible scenario, television receiver 102 may be operating in its television mode, with conventional television video signals being displayed on a full screen of display 114. If an incoming video conference call is detected by video conference source 104, commands 112 may be provided to (1) mute the television video sound, (2) select a picture-in-picture mode and place the television video signals in such a picture-in-picture window, and (3) configure the remaining portion of display 114 for the incoming video conference image signals (or vice versa). At the end of the call, additional commands 112 to restore the original operating mode of television receiver 102 may be provided. Thus, as a first step, video conference source 104 may store the current operating configuration of television receiver 102 before transmitting new set-up/alignment commands 112. As an additional example, if the television receiver 102 is turned off and an incoming video conference call is detected, video conference source 104 would transmit appropriate commands 112 to turn on the television receiver 102 and configure the entire display 114 to accommodate the video conference image data. Many other control operations are possible depending upon the operating mode of television receiver 102 and desired user responses to answering and/or initiating video conference operations (e.g., ring before answer, auto-answer, etc.)

The present invention provides several advantages for the control of television receivers. For example, a television receiver which is typically setup to overscan the picture may be automatically configured in accordance with the above procedures to allow a computer-generated image to use the entire visible raster. Thus, the outer edges of the computer-generated image will not be cut off when displayed on the television receiver. No manual control inputs to adjust the picture size to accommodate the entire computer-generated image are necessary. Further, when the television receiver is used to display conventional television video input signals, the original display size may be automatically recovered by loading a preferred set of set-up/alignment parameters.

Thus a method and apparatus for automatically configuring a television receiver to display computer generated images have been described. Although features and examples of the present invention have been described with reference to specific exemplary embodiments thereof, those skilled in the art will appreciate that certain modifications may be possible without departing from the broader spirit and scope of the invention which should be limited only by the claims which follow.

What is claimed is:

1. A method of aligning a television receiver for use during a video conference, comprising:

receiving, from a video conference source, one or more alignment commands for one or more television alignment parameters chosen from a list including picture size or position parameters, picture geometry parameters, or picture video form at parameters, said receiving occurring through an existing command signal path within the television receiver originally provided for use other than by the video conference source and without requiring manual control inputs by an operator of the television receiver, decoding, at the television receiver, the one or more alignment commands to obtain corresponding alignment parameters for the television receiver; and configuring a display output of the television receiver in accordance with the corresponding alignment parameters decoded from the one or more alignment commands.

2. The method of claim 1 further comprising formatting, at the video conference source and prior to receiving the alignment commands, the one or more alignment commands according to a signal protocol compatible for use with the command signal path within the television receiver.

3. The method of claim 2 further comprising transmitting the formatted alignment commands to the television receiver.

4. The method of claim 1 wherein decoding the alignment commands comprises accessing a table to retrieve the corresponding alignment parameters.

5. The method of claim 4 wherein the corresponding alignment parameters comprise pre-stored alignment parameter sets for optimizing the display of video conference image data.

6. The method of claim 1 further comprising transmitting from the television receiver to the video conference source, one or more control inputs received through the existing command signal path.

7. The method of claim 6 wherein the existing command signal path comprises a television remote control signal path.

8. The method of claim 6 wherein the control inputs include address information which identifies the control inputs as being directed to the video conference source.

9. A television receiver, comprising:

a control port coupled to receive, from a video conference source and not from a manual input source, one or more alignment commands for one or more television alignment parameters chosen from a list including picture size or position parameters, picture geometry parameters, or picture video format parameters, the control port further coupled to provide the received alignment commands to an existing command signal path within the television receiver originally provided for use other than by the video conference source; and a controller included within the command signal path and coupled to receive the alignment commands from the control port, the controller being configured to decode the alignment commands to obtain corresponding alignment parameters for the television receiver and to provide display alignment commands for the television receiver in response thereto.

10. The television receiver of claim 9 wherein the command signal path comprises a television remote control signal path configured to receive television command inputs from a manually operated remote control.

11. The television receiver of claim 10 wherein the command signal path is further coupled to an output jack of the television receiver and is configured to pass video conference commands entered via the manually operated remote control to the video conference source.

12. The television receiver of claim 9 wherein the controller is coupled to a memory storing television alignment parameters and the controller is configured to retrieve one or more of the stored television alignment parameters when decoding the alignment commands.

13. The television of claim 12 wherein the television alignment parameters are stored in a look-up table.

14. The television receiver of claim 12 wherein the memory comprises a read only memory.

15. The television receiver of claim 9 wherein the controller is further coupled to receive command inputs initiated by a manually operated remote control units through the command signal path and is configured to identify whether the commands are intended for the television receiver or the video conference source.

16. The television receiver of claim 15 wherein the controller is configured to identify whether the commands are intended for the television receiver or the video conference source on the basis of address information included in the commands.

17. A video conference system, comprising:

a video conference source including a television remote control simulator configured to provide one or more television alignment commands in a protocol recognizable by an existing command path within a television receiver that was originally provided for use other than by the video conference source, the alignment commands being for adjustment of one or more television alignment parameters chosen from the list including picture size or position parameters, picture geometry parameters, or picture video format parameters, the alignment commands being provided automatically during a video conference application, without manual control input, and the television receiver coupled to the video conference source and configured to receive the alignment commands through a control port in which the alignment commands are buffered prior to decoding, the control port being coupled to the existing command path within the television receiver.

18. The video conference system of claim 17 wherein the television receiver includes a controller coupled to receive the alignment commands from the control port and configured to produce one or more display alignment commands for the television receiver in response thereto.

19. The video conference system of claim 18 wherein the controller is included within the existing command path of the television receiver and is further configured to receive commands entered via a manually operated remote control unit.

20. The video conference system of claim 19 wherein the controller is further configured to determine whether or not the commands entered via the manually operated remote control unit are intended for the television receiver or the video conference source according to address information included in the commands and to produce television control commands or not in accordance with the decision.

* * * * *